United States Patent [19]

Araki et al.

[11] Patent Number: 5,871,426
[45] Date of Patent: Feb. 16, 1999

[54] MACHINING CENTER

[75] Inventors: Norimitsu Araki, Yokkaichi; Kazumi Hattori, Gifu, both of Japan

[73] Assignee: Howa Machinery, Ltd., Aichi-ken, Japan

[21] Appl. No.: 934,041

[22] Filed: Sep. 19, 1997

[30] Foreign Application Priority Data

Oct. 2, 1996 [JP] Japan .................................. 8-262025

[51] Int. Cl.[6] .................................................. B23Q 3/157
[52] U.S. Cl. .................................. 483/44; 483/48; 483/49
[58] Field of Search .................................. 483/60, 67, 40, 483/41, 48, 32, 38, 39, 2, 3, 36, 44, 49

[56] References Cited

U.S. PATENT DOCUMENTS

| | | | |
|---|---|---|---|
| 3,691,655 | 9/1972 | Kurimoto et al. | 483/41 |
| 4,363,166 | 12/1982 | Hiller | 483/40 |
| 4,602,901 | 7/1986 | Ramusino | 483/32 X |
| 4,742,609 | 5/1988 | Neumann | 483/3 |
| 5,649,887 | 7/1997 | Taki et al. | 483/3 |

FOREIGN PATENT DOCUMENTS

| | | | |
|---|---|---|---|
| 293509 | 12/1988 | European Pat. Off. | 483/40 |
| 358004333 | 1/1983 | Japan | 483/40 |
| 136751 | 6/1986 | Japan | 483/2 |
| 1-149232 | 10/1989 | Japan . | |
| 7-30260 | 7/1995 | Japan . | |
| 2157996 | 11/1985 | United Kingdom | 483/3 |

*Primary Examiner*—William R. Briggs
*Attorney, Agent, or Firm*—Ladas & Parry

[57] ABSTRACT

A machining center has a tool change device provided above a horizontally mobile column that has a main spindle for holding a tool. A circular tool magazine for carrying a plurality of tools in a horizontal attitude is provided on a support base which is positioned above the region in which the mobile column moves. The support base is supported in a cantilever fashion by posts erected on a bed. The tool magazine rotates within a horizontal plane for indexing tools to a standby position. The tools are accommodated in pots suspended via rolling members from the body of the tool magazine and adapted to move along a ring-shaped path under the tool magazine body. The tool magazine body has a local removal opening or cutout, from where a shifter at a standby position carries a pot to a tool delivery position.

13 Claims, 6 Drawing Sheets

MACHINING CENTER

BACKGROUND OF THE INVENTION

1. Field of the Invention

The present invention relates to a machining center in which a tool change device is provided above a mobile column.

2. Description of the Related Arts

Japanese Patent Laid-Open Publication No. Hei 1-149232 published on Oct. 16, 1989 and Japanese Patent Laid-Open Publication No. Hei 7-30260 published on Jul. 12, 1995 disclose conventionally known machining centers of this type. In the machining center of the former, a tool magazine is disposed on a fixed frame provided above a mobile column and a tool change arm is provided on top of the mobile column. In the tool magazine, tools are held horizontally and are indexed within a horizontal plane by a chain. A tool indexed to a standby position is lowered to a tool delivery position by conveyance means and is exchanged with a tool on the main spindle by the tool change arm. In the machining center of the latter, tools are held horizontally in a tool magazine above a column. A tool is indexed to a standby position within a vertical plane by means of a revolving magazine plate, lowered from the standby position to a tool delivery position by conveyance means and exchanged with a tool on the main spindle by a tool change arm provided on a fixed frame.

In the former machining center, tools are lowered to the bottom of the tool magazine by conveyance means, so that the overall height of the machining center increases due to the upward and downward strokes of the conveyance means. Furthermore, since the tools are rotated by a chain, considerable force is needed to index them, resulting in the problem that a large magazine drive motor is required. Moreover, since the tool change arm is provided above the mobile column, the overall weight of the mobile column is increased, impeding high-speed movement. In the latter machining center, tools are conveyed upwards and downwards and the tool indexing direction is set within a vertical plane, thereby further increasing the overall height of the device. Another disadvantage is that, as in the chain indexing system, a large magazine drive motor is required since indexing is performed by a magazine plate.

Furthermore, in a conventional machining center, a fixed frame supported by four columns on the left and right at the front and rear is provided above a mobile column and a tool magazine is disposed on this fixed frame (support base). A tool indexed by the tool magazine is lowered to a tool delivery position below and is exchanged with a tool on the main spindle provided to the mobile column.

In this conventional machining center, the fixed frame which supports the tool magazine is itself supported by the four columns at the front, rear, left and right, so that the front left and front right columns are inevitably positioned at the sides or front of the machining region, hindering operations performed in the machining region such as, for instance, replacement or inspection of the workpieces, resulting in the problem that the machining region is restricted.

Furthermore, since a tool in the index position in the tool magazine is moved downwards in a horizontal attitude and moved to the tool delivery position for the tool change, the area below the indexed position of the tool magazine constitutes a large opening directed towards the machining space, resulting in the problem that machining chips and so on can easily enter the indexed position and cause malfunctions. In order to solve this problem, an open-close door and a cleaning device must be added, consequently raising costs.

SUMMARY OF THE INVENTION

It is therefore an object of the present invention to provide a machining center having a slimline tool change device capable of reducing the total height of the machine.

Another object of the present invention is to provide a machining center in which the size of the indexing drive source such as a motor in the tool magazine can be reduced.

A further object of the present invention is to provide a machining center wherein a support base upon which a tool magazine is arranged is stably supported in a overhung state by support columns at the rear side, support frame columns are removed from the sides and front of the machining region so that workability in the machining region is improved, and the tool magazine is stably supported thereby enabling tool changing to be reliably carried out even when the support base is supported in an overhung state by rear side support columns, said machining center also capable of reducing costs.

In order to achieve the above object, the present invention comprises a machining center comprising a tool change device disposed above columns, said tool change device comprising a tool magazine for turning a plurality of tools in a horizontal attitude and indexing the tools to a standby position; a conveyance mechanism for horizontally extracting a tool in the standby position to an outer side of the tool magazine and conveying the tool to a tool delivery position; and a tool change arm for exchanging a tool on a main spindle with a tool in the tool delivery position. In other words, in order to reduce the total height of the device, the present invention turns the tool in a horizontal attitude and convey it horizontally before changing.

In order to reduce the total weight of the column, the machining center of the present invention further comprises a support base for supporting the tool change device above the space in which the columns move independently from the columns.

When horizontal tools are supported protruding from pots and are indexed, the protruding portions of the tools act as load deviation on the pots. A countermeasure against this load deviation is required in order to index tools smoothly. In order to ensure smooth tool indexing, the machining center of the present invention comprises a plurality of pots accommodating portions of tools, guide means for holding the pots in a horizontal attitude via rolling members and guiding them along a ring-shaped path, and drive means for moving the pots along the ring-shaped path and a removal opening provided to the guide means at the standby position for removing the pots. Furthermore, the conveyance mechanism comprises a shifter capable of moving along a straight line between the removal opening and the tool delivery position, said shifter comprising a holding portion for holding in a horizontal attitude pots received from the guide means at the removal opening.

A chain can be used as the drive means, but chain systems are prone to deteriorating indexing precision due to stretching, and a large-scale system is required to obtain a large driving force. In order to achieve high-precision tool indexing with small drive means, in the machining center of the present invention, the drive means comprise an indexing disc which revolves around an axis which is also an axis of the ring-shaped path; and notches provided in an outer rim of the indexing disc, with and from which portions of pots can be engaged and disengaged in radial directions of the indexing disc.

Furthermore, in order to grip pots during conveyance, the shifter further comprises a grip element for gripping pots; and the removal opening further comprises release means for releasing pots from said grip element.

Moreover, the conveyance mechanism comprises position determining means for ensuring that pots are positioned in the tool delivery position.

Furthermore, in the machining center of the present invention, posts are disposed on a bed for supporting an end of the support base in an overhung state; and the conveyance mechanism is provided on the support base for extracting tools indexed by the tool magazine out from the tool magazine and for conveying them forward to the tool delivery position.

Furthermore, in the machining center of the present invention, the support base is supported at a back of the region in which the mobile column moves, and the tool magazine and the conveyance mechanism are provided to the support base.

Furthermore, the machining center of the present invention comprises a shielding plate provided adjacent the tool delivery position to partition spaces to front and rear; a through-window is provided in the shielding plate; and tools are conveyed horizontally forward by the conveyance mechanism through the through-window to face the front.

Furthermore, in the machining center of the present invention, a rear end of the support base is supported in an overhung state only by a pair of posts on left and right.

DESCRIPTION OF THE PREFERRED EMBODIMENTS

Figure 1:
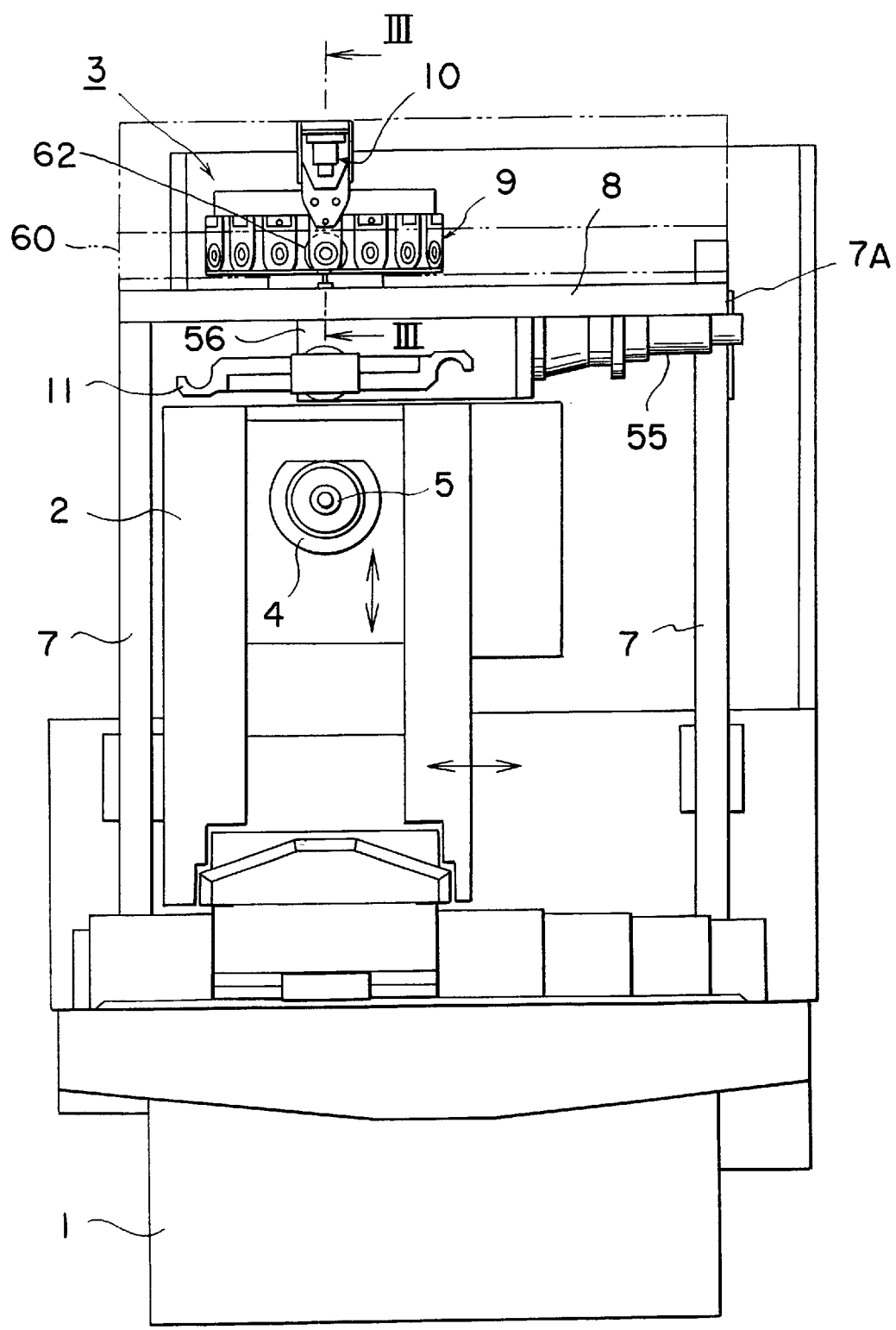
FIG. 1 is a front view of a machining center in a first embodiment of the present invention.

The preferred embodiments of the present invention will now be described with reference to the diagrams. First, the overall configuration of the machining center of the present invention will be described with reference to FIG. 1 and FIG. 2.

In this machining center, a mobile column 2 capable of moving forwards and backwards (to the left and right as viewed in FIG. 2) and leftwards and rightwards (to the left and right as viewed in FIG. 1), is disposed above a bed 1, and a tool change device 3 is disposed on a support base 8 which is fixed above the mobile column 2. A spindle head 4 is capable of ascending and descending on and relative to the mobile column 2 and a main spindle 5 is driven by a motor 6 so as to revolve around a horizontal axis. A pair of posts 7 are provided on the left and right behind the region in which mobile column 2 moves, and the rear end of a support base 8 of tool change device 3 is horizontally secured to the top ends of posts 7. Support base 8 is supported in a cantilever fashion by posts 7. A gusset 7A reinforces the contact portion between support base 8 and posts 7. This gusset 7A is positioned outside the area in which mobile column 2 moves in order to prevent interference.

Figure 2:
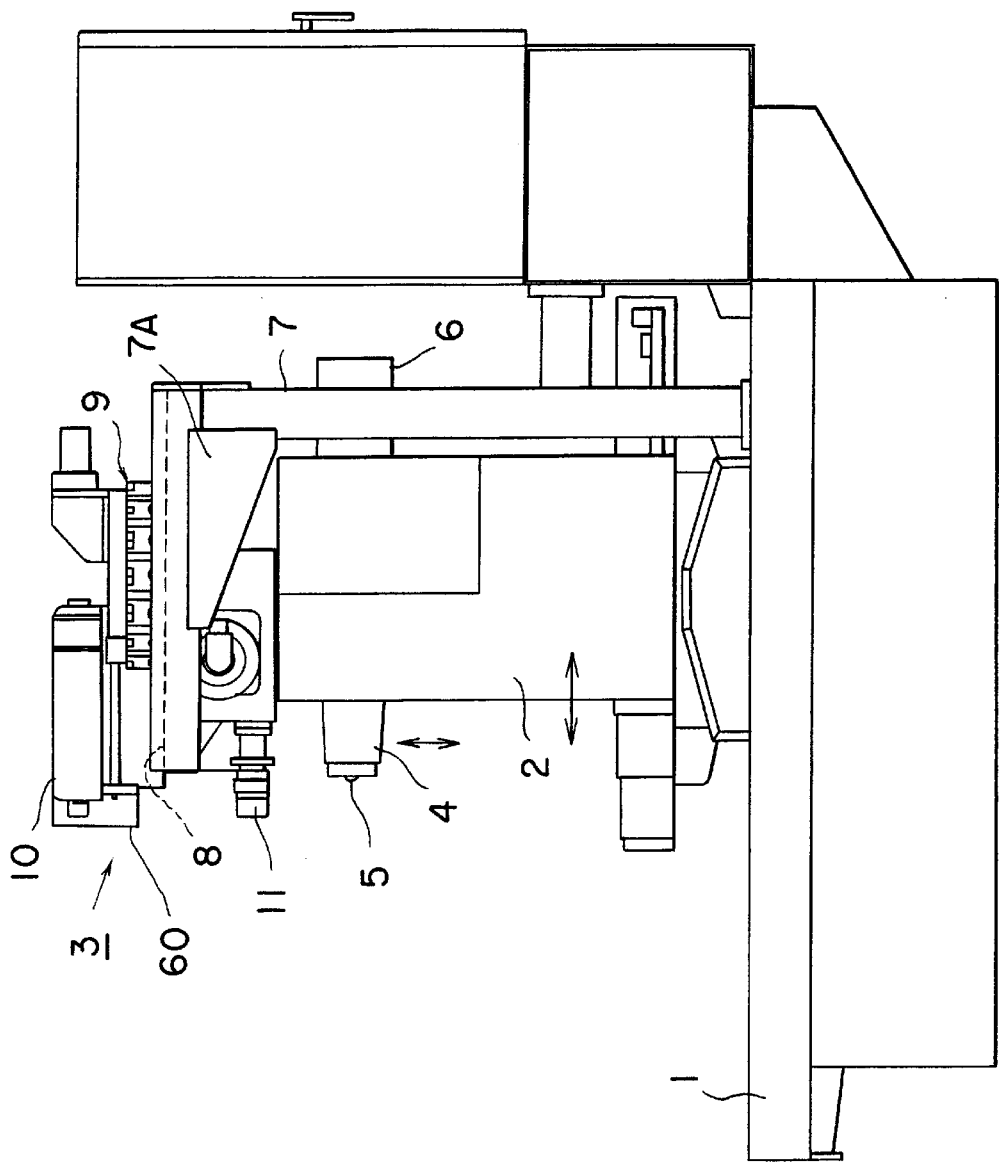
FIG. 2 is a right side view of the same machining center.

Since support base 8 is supported in a cantilever fashion by posts 7 provided at the rear of mobile column 2, there are no posts at the sides and at the front of the machining region in front of support base 8 with the exception of the rear side as shown in FIG. 2, the area around the machining region is widely open.

Tool change device 3 comprises a tool magazine 9, a conveyance mechanism 10 and a change arm 11. Support base 8 supports the entire tool change device 3 above and is separated from the space within which the mobile column 2 moves. Furthermore, in order to reduce the total height of the machining center, tool change device 3 is disposed in extreme proximity to mobile column 2, so that the space between the bottom of change arm 11 and the top of mobile column 2 is, for instance, 10 mm.

Figure 3:
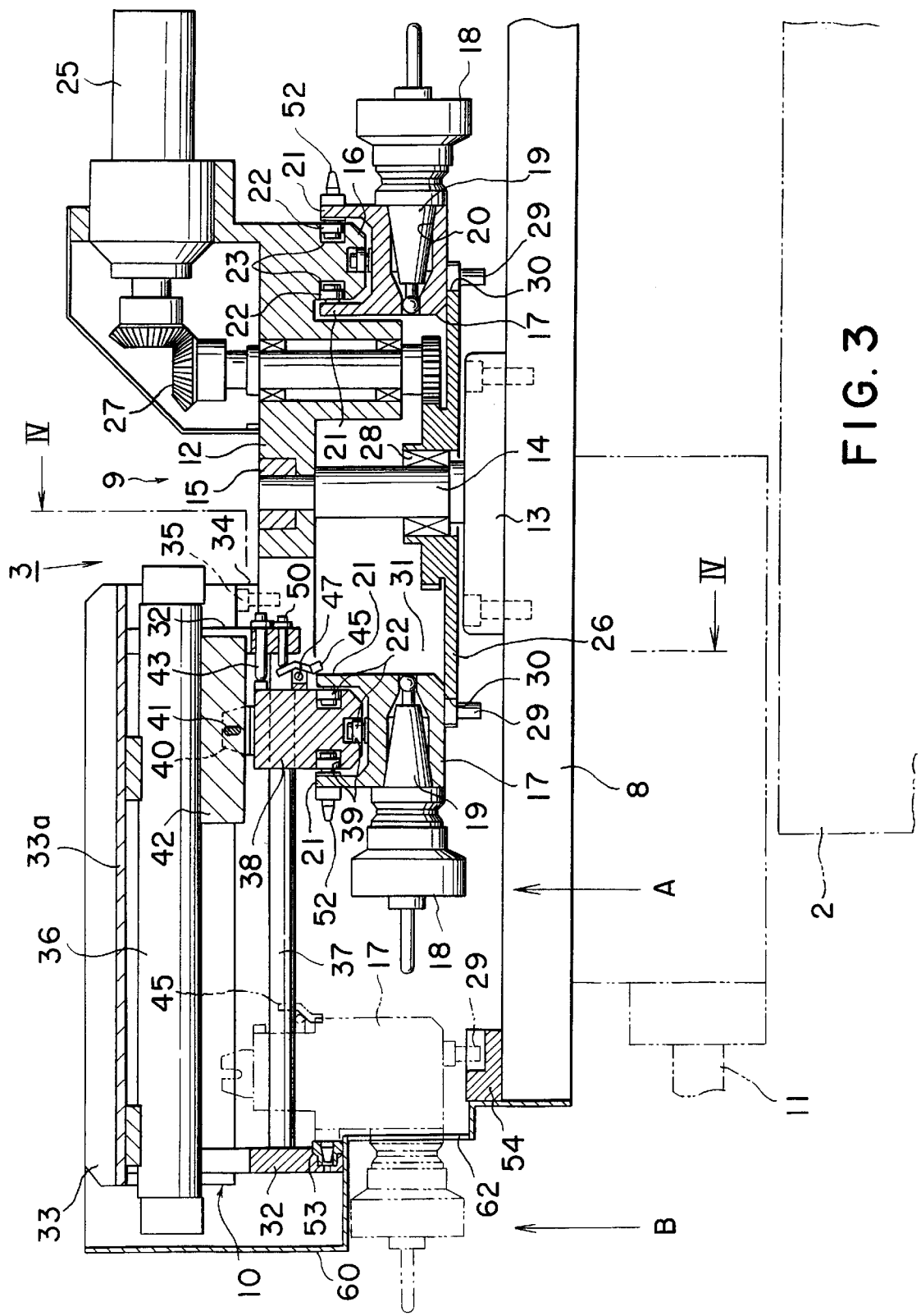
FIG. 3 is a vertical sectional view taken on line III—III of the tool change device in FIG. 1.

Next, the configuration and operation of tool change device 3 will be explained with reference to FIG. 3 to FIG. 6. As FIG. 3 shows, a vertical spindle 14 stands on a support platform 13 which is fixed to support base 8. A circular main body 12 of tool magazine 9 is fixed to the top of vertical spindle 14 by means of a fixing ring 15. From below the magazine main body 12 protrudes a ring-shaped rail 16 downwards, from which are suspended multiple pots 17. Each pot 17 holds a tool 18 in a horizontal attitude. Each pot 17 is provided with a hole 20 to contain shanks 19 of tools 18, a pair of inner and outer suspension arms 21 facing the inner and outer rims of rail 16 and a plurality of rolling members 22 mounted on the suspension arms 21. Rolling members 22 are fitted into horizontal guide grooves 23 provided on the outer and inner rims and lower surface of rail 16. These guide grooves 23 constitute guide means running along a horizontal ring-shaped path and hold the pots 17 in a horizontal position by means of rollers or rolling element 22.

Figure 5:
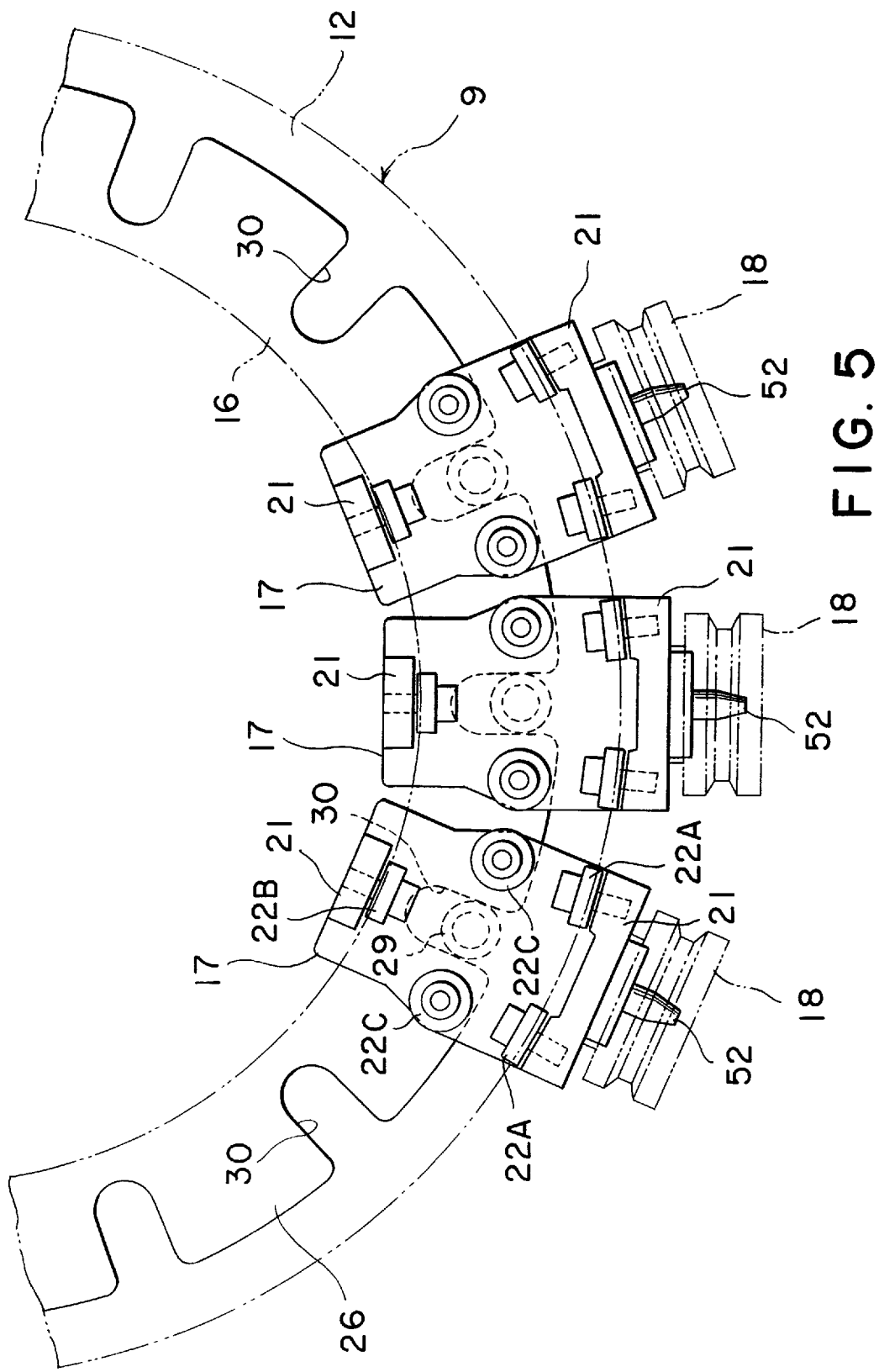
FIG. 5 is a top view of an arrangement of pots in the tool change device in FIG. 3.
Figure 6:
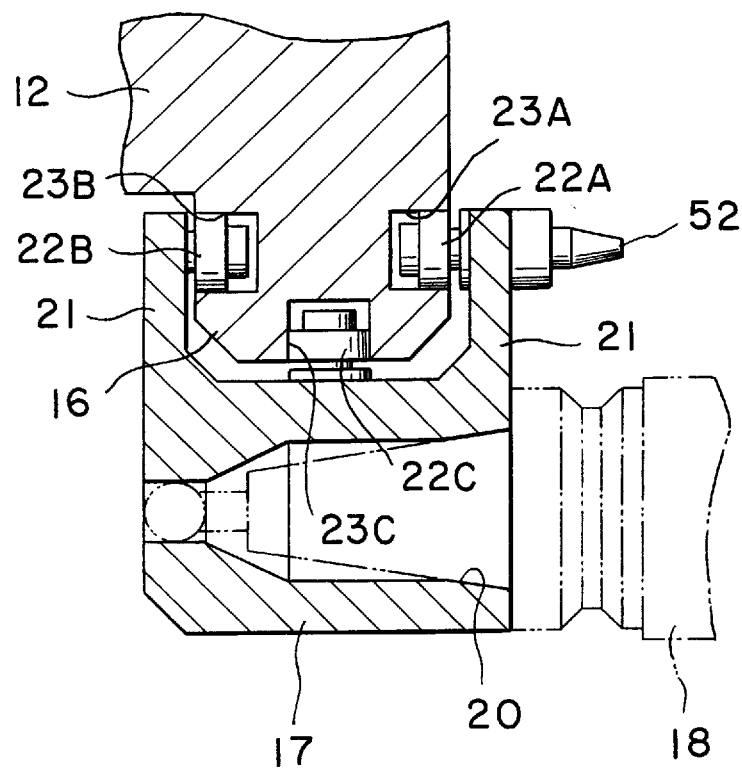
FIG. 6 is an enlarged view of the principal elements of FIG. 1 in order to explain the function of rotating members.

As FIG. 5 and FIG. 6 show, in this embodiment each pot 17 has five rolling members 22. Two rolling members 22A supported by the suspension arm 21 on the outside of pot 17 fit into guide groove 23A; one rolling member 22B supported by the inside suspension arm 21 fit into guide groove 23B on the inner rim; these three rolling members 22A and 22B hold pot 17 in a predetermined vertical position and in a secure horizontal position. Further two rolling members 22C, supported on top of pot 17 between suspension arms 21, fit into a guide groove 23C on the lower surface of rail 16; the rolling members 22C holding pot 17 in a predetermined position with respect to the magazine radial direction. Therefore, countermeasures against load deviation when indexing a tool 18 in a horizontal attitude within a horizontal plane can be perfected, and pots 17 can be rotatingly guided and tools 18 smoothly indexed with a far smaller friction than is the case in a sliding guidance system.

As FIG. 3 and FIG. 5 show, drive means for pots 17 comprise a motor 25 which is provided on the top of magazine main body 12, an indexing disc 26 which rotates around the same axis as the ring-shaped path and a gear mechanism 27 which rotates indexing disc 26 by means of motor 25. Indexing disc 26 is supported via a bearing 28 on the lower end of the vertical spindle 14 so as to rotate around said vertical spindle 14. Notches 30 are provided to the outer rim of indexing disc 26, and engaging pins 29 which protrude downwards from the bottoms of pots 17 can be engaged in and disengaged from the notches 30 in radial directions. Tool magazine 9 holds multiple tools 18 in the horizontal attitude by means of pots 17, and indexing disc 26 horizontally turns pots 17 smoothly rolling members 22, thereby sequentially indexing the tools 18 to a standby position A. In tool magazine 9, standby position A is directly above main spindle 5 when column 2 has been shifted to the tool change position (see FIG. 1), and a removal opening 31 for pots 17 is formed into rail 16 at the point corresponding to standby position A. The indexing disc 26 drive system requires less driving force than a chain system. Moreover, since the pots 17 is guided via the rolling members, a small motor 25 can be used as the indexing drive source, thereby enabling the tool change device 3 to be slimlined.

A support frame 33 of conveyance mechanism 10 is disposed above standby position A so as to protrude to the front (to the left in FIG. 3) of tool magazine 9 and is secured at the proximal end thereof to the top of tool magazine 9 via a foot 34 with bolts 35. Two guide rods 37 are provided horizontally and in parallel between vertical plates 32 at the front and rear of support frame 33. A shifter 38 for shifting pots 17 is provided on these guide rods 37 so as to move in a straight line between removal opening 31 and a delivery position B which is at the front of the removal opening. Shifter 38 has substantially the same sectional shape as rail 16 and has three hold grooves 39 formed on its front, back and bottom. When shifter 38 is placed in removal opening 31, the positions of hold grooves 39 match the positions of guide grooves 23 on rail 16 (see FIG. 4) and rolling members 22 are shifted from guide grooves 23 into hold grooves 39 so that shifter 38 holds pot 17 horizontally via rolling members 22.

A rodless cylinder 36 is disposed horizontally on an upper plate 33a of support frame 33. A connecting piece 40 is provided on top of shifter 38 and is connected to a slider 42 of the rodless cylinder 36 via a pin 41. Conveyance mechanism 10 uses rodless cylinder 36 to drive shifter 38 back and forth. When shifter 38 advances or moves to the left as viewed in FIG. 3, the pot 17 at standby position A is drawn horizontally to the outside of tool magazine 9 and is shifted to delivery position B; and when shifter 38 withdraws, pot 17 is shifted from delivery position B to standby position A. A stopper bolt 43 for stopping shifter 38 at a fixed position in removal opening 31 is provided to one of vertical plates 32 on the proximal side of support frame 33.

Figure 4:
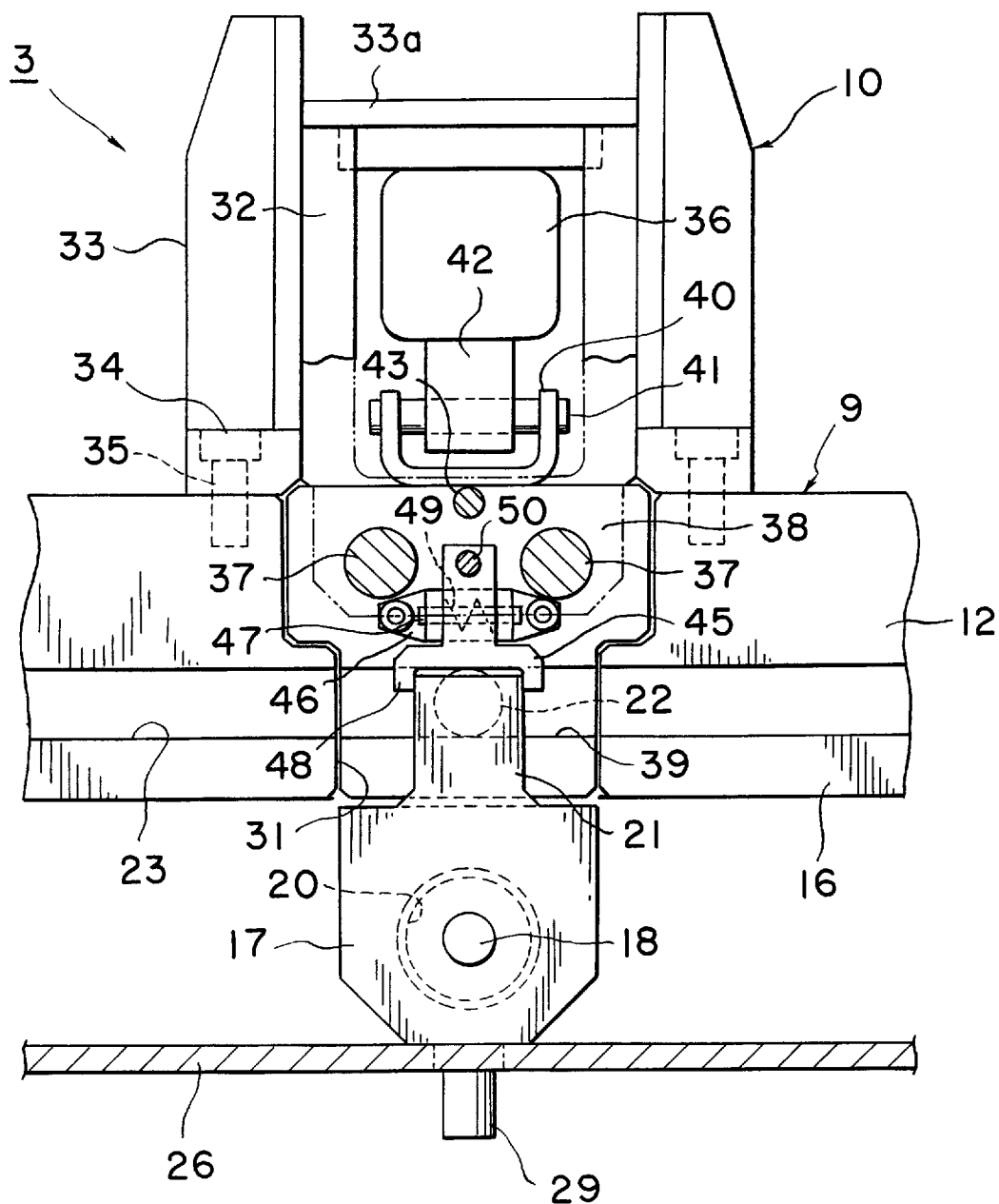
FIG. 4 is a section taken on line IV—IV in FIG. 3.

As FIG. 4 shows, a swingable grip element 45 is mounted via a bracket 46 to the back of shifter 38, the grip element 45 being able to rotate around a pin 47, and a pair of grip arms 48 protrude from the bottom of grip element 45. While pot 17 is being conveyed by shifter 38, a torsion spring 49 moves grip element 45 to the operating position (indicated by the chain line in FIG. 3), grip arms 48 grip from above both sides of inner suspension arms 21 of pot 17 and pot 17 is held in a fixed position relative to shifter 38, thereby preventing rolling members 22 from falling out of hold grooves 39. Furthermore, a release bolt 50 is provided protruding forward from the vertical plate 32 beneath stopper bolt 43. When shifter 38 has returned to removal opening 31, release bolt 50 abuts grip element 45 to swing it counterclockwise in FIG. 3 against the force of torsion spring 49 to the non-operating position (solid line in FIG. 3) and releases grip arms 48 from suspension arms 21 so that pot 17 can be shifted in the rotary indexing direction of tool magazine 9 from standby position A. Since grip element 45 is disengaged against torsion spring 49 by means of bolt 50 utilizing the shift of shifter 38, expensive drive means such as a separate power actuator are not necessary.

Furthermore, a position determining pin 52 protrudes from the outer suspension arm 21 of each pot 17, bushing 53 through which position determining pin 52 can be inserted is affixed to vertical plate 32 on the distal end of support frame 33, and a position determining block 54 into an engaging pin 29 is engageable is fixed above the front tip of support base 8. Thus these elements 52 to 54 constitute position determining means for automatically securing the position of pots 17 at delivery position B when shifter 38 has shifted each pot 17 forward. As shown in FIG. 1, tool change arm 11 is supported by a support 56 fixed to the underside of support base 8 in such a manner that change arm 11 is able to turn about a horizontal axis and move along the axis. A tool 18 in delivery position B can be exchanged with a tool on main spindle 5 by means of conventionally known turning and inserting operations. The change arm 11 is turned by a motor 55.

A shielding plate 60 partitioning spaces to the front and rear is securely fixed to both support base 8 and support frame 33 in the vicinity of delivery position B of tool magazine 9 between delivery position B and standby position A. Shielding plate 60 shields the installation spaces of tool magazine 9 and conveyance mechanism 10 from the space above the machining region, thereby improving the external appearance of the machining center by making these elements invisible from the front, as well as preventing machining chips from entering therein. A through-window 62 for passing tools is provided in shielding plate 60 at the portion corresponding to the path along which conveyance mechanism 10 shifts tools 18. Through-window 62 comprises a through hole which is round or polygonal or the like, and is as small as possible while nevertheless being large enough for a tool 18 to be inserted forwards and backwards. This prevents machining chips from entering through-window 62 and does not spoil the external appearance of the machining center. Multiple open-and-close rubber strips or the like may be provided in a vertical arrangement so as to seal through-window 62. Through-window 62 is disposed immediately behind the portion to be gripped by the change arm 11, of a tool 18 positioned at delivery position B, as far forward as is possible without causing shielding plate 60 to interfere with change arm 11, thereby covering pots 17 which are shifted to the front, while preventing machining chips and so on from entering the holes 20 of the pots 17.

Description is made above of a tool magazine in which pots are horizontally turned by an indexing disc, but a configuration in which the indexing disc turns pots vertically is equally usable. Furthermore, the tool magazine may be configured so that tools are held by a rotating body which is indexed while rotating; in that case, a tool in the indexed position is extracted and shifted forward. Furthermore, in a case where the tool index position is further rear relative to the tool delivery position, when the tool in the indexed position is not facing frontwards, the direction of the tool is altered so that the cutting edge faces frontwards prior to shifting the tool forward to the delivery position. Furthermore, though two columns should preferably by provided at the rear side on the left and right, three or more columns or one wide plank-shaped column can acceptably be provided.

Furthermore, the following examples represent embodiments in which elements in the configuration can be altered without departing from the scope of the present invention:

(1) In FIG. 5, the number of rolling members 22 can acceptably be altered so that, for instance, there are two rolling members 22B on the inner rim of rail 16 and one rolling member 22A on the outer rim;

(2) shifter 38 may be driven by a rod-type air cylinder or a motor; and (3) tool change arm may be provided on the top of the column;

As described in detail above, according to the present invention, the tool change device indexes tools by turning the tools in a horizontal attitude, shifting them horizontally to the tool delivery position and exchanging them, whereby the tool change device can be slimlined, thereby enabling the total height of the machining center to be reduced. Furthermore, since tools are extracted from the tool magazine by a conveyance mechanism which conveys them horizontally to the tool delivery position and hands them to the change arm, there is no danger of the change arm interfering with the tools on the magazine when turning even when the tool hold pitch of the tool magazine is made small, as is the case when the change arm extracts tools directly from the tool magazine, enabling multiple tools to be held by a tool magazine of limited size.

According to an aspect of the present invention, the support base supports the tool change device above the space in which the column moves separately therefrom, whereby the overall weight of the column is reduced, enabling the column to be shifted at high speed during processing.

According to another aspect of the present invention, the tool magazine further comprises guide means for rotatingly guiding pots in a horizontal attitude, and the shifter of the conveyance mechanism further comprises a hold portion for holding pots in a horizontal attitude. Therefore, even in an indexing system wherein tools are held protruding from the pots, tool indexing can be smoothly carried out with low driving force, thereby enabling the scale of the index drive source consisting of a motor and the like to be reduced.

According to a further aspect of the present invention, the pots are driven by an indexing disc and tools can therefore be indexed with a smaller driving force and a higher degree of precision than is possible with a chain indexing system.

According to a still further aspect of the present invention, the shifter further comprises a grip element for gripping pots during shifting, pots can be held in the fixed position of the shifter, thereby reliably preventing the rolling members from falling.

According to a further aspect of the present invention, position determining means are provided to ensure that pots are positioned in the tool delivery position, whereby the tool change arm can reliably deliver and receive tools at the tool delivery position.

According to another aspect of the present invention, a rear end of the support base which supports the tool magazine is supported by posts disposed on a bed, and posts for supporting the support base have been removed from the sides and front of the machining region. As a consequence, operations in the machining region can be easily performed in any given direction from the sides or the front without being hindered by the posts, thereby improving workability and operation efficiency. Furthermore, tools indexed from the tool magazine are conveyed forward to the tool delivery position, whereby the tool magazine can be provided close to the rear end of the support base. Therefore, the moment acting upon the support base due to the weight of the tool magazine can be reduced and the tool magazine can be securely supported. Consequently, even when the support base is supported in an overhung state, tools can be changed reliably and the supporting structure can be more easily manufactured, thereby reducing costs.

According to still another aspect of the present invention, the support base is supported in an overhung state by posts arranged on a bed at a back of the region in which the mobile column moves, whereby the mobile column can move left and right without being hindered by the posts. Furthermore, since the support base is supported in an overhung state, the left-to-right movement region of the mobile column can be extended.

In a further aspect of the present invention, a shielding plate partitioning spaces to the front and rear is provided in the vicinity of the tool delivery position, and a through-window disposed in the shielding plate faces tools which are shifted forward and backward horizontally by the conveyance mechanism. Consequently, the size of the through-window for shifting tools to the tool delivery position can be reduced, whereby machining chips can be prevented from entering the conveyance mechanism and the tool magazine using a simplified configuration, and the front of the tool magazine can be covered by the shielding plate, thereby improving the external appearance and safety of the machining center.

Finally, according to an aspect of the present invention, the rear end of the support base is supported only by a pair of posts on the left and right, whereby the support structure of the support base- can be simplified.

While there have been described what are at present considered to be preferred embodiments of the invention, it will be understood that various modifications may be made thereto, and it is intended that the appended claims cover all such modifications as fall within the true spirit and scope of the invention.

What is claimed is:

1. A machining center in which a tool change device is disposed above a mobile column, said tool change device comprising:

a tool magazine for turning a plurality of tools and indexing them to a standby position;

a conveyance mechanism for horizontally extracting a tool in the standby position from the tool magazine and conveying it to a tool delivery position;

a tool change arm for exchanging a tool in the delivery position with a tool on a main spindle, wherein the tool magazine includes:

a plurality of pots accommodating portions of tools, respectively;

guide means for holding the pots in a horizontal attitude via rolling members and guiding them along a ring-shaped path; and drive means for moving the pots along the ring-shaped path;

a removal opening provided to the guide means at the standby position for removing the pots therefrom;

wherein:

said conveyance mechanism includes a shifter capable of moving along a straight line between the removal opening and the delivery position, said shifter comprising a holding portion for holding in a horizontal attitude pots received from the guide means at the removal opening.

2. A machining center comprising:

a bed;

a column disposed above the bed, and being movable within a space above the bed;

a support base fixedly supported on said bed directly above said space and over said column;

a tool magazine mounted on said support base and including a circular main body rotatable in an indexing motion about a vertical axis, said main body detachably carrying a plurality of tools with their major axes oriented horizontally, said main body being rotatable to index one of the tools carried thereby to a standby position which is aligned with a tool delivery position disposed radially outwardly of said main body;

a horizontal conveyance mechanism for horizontally removing said one of the tools in said standby position out from the tool magazine and conveying it linearly and radially outward of said main body to said tool delivery position, with the major axis of the tool remaining horizontal;

a main spindle mounted on said column; and a tool change arm movable between said tool delivery position and said main spindle to exchange a tool in the tool delivery position and a tool on said main spindle.

3. A machining center according to claim 2, wherein said tool magazine further comprises:

a plurality of pots for accommodating portions of tools with the axes of tools oriented horizontally, respectively;

guide means provided to said main body for holding the pots at intervals in a circumferential direction of the main body; and drive means for moving the pots in said circumferential direction.

4. A machining center according to claim 3, further comprising:

a removal opening provided in said guide means at said standby position for enabling removal of a pot from the main body.

5. A machining center according to claim 3, wherein said conveyance mechanism comprises:

a shifter movable along a straight line between said removal opening and said tool delivery position, said shifter including a holding portion for holding a pot received from said guide means at the removal opening.

6. A machining center according to claim 5, wherein:

said shifter further comprises a grip element for gripping a pot during conveyance; and the removal opening further comprises release means for releasing a pot from the grip element.

7. A machining center according to claim 3, wherein:

said drive means comprises an indexing disc coaxial with said main body of the tool magazine, said indexing disc including notches formed at intervals along an uter rim of the indexing disc, engaging pins projecting from said means for detachably carrying the tools and engaging the notches, and a motor for rotating said indexing disc.

8. A machining center according to claim 2, further comprising:

position determining means for determining that a pot is positioned in the delivery position.

9. A machining center according to claim 2, wherein the conveyance mechanism further comprises:

posts disposed on the bed for supporting an end of the support base in an overhung state; and the conveyance mechanism is provided on the support base for extracting tools indexed by the tool magazine out from the tool magazine and for conveying them forward to the delivery position.

10. A machining center according to claim 9, wherein the support base is supported behind said space in which the mobile column moves.

11. A machining center according to claim 2, further comprising:

a shielding plate provided adjacent the tool delivery position to partition spaces to front and rear; and a through-window formed in said shielding plate, wherein tools conveyed horizontally by the conveyance mechanism pass through said through-window.

12. A machining center acording to claim 9, wherein the support base is supported in an overhung state only by the posts.

13. A machining center according to claim 2, wherein said spindle is movably mounted on said column and under said support base.

* * * * *